United States Patent Office 3,472,905
Patented Oct. 14, 1969

3,472,905
NOVEL PERHALOALKYL-SUBSTITUTED UNSATURATED FLUOROALKANES
Bernard M. Lichstein, Elizabeth, and Cyril Woolf, Morristown, N.J., assignors to Allied Chemical Corporation, New York, N.Y., a corporation of New York
No Drawing. Filed May 26, 1967, Ser. No. 641,468
Int. Cl. C07c 17/00, 21/18
U.S. Cl. 260—653.3
4 Claims

ABSTRACT OF THE DISCLOSURE

This specification discloses novel perhaloalkylsubstituted fluoroolefins wherein a fluorine atom is attached to a primary carbon atom. These novel fluoroolefins are prepared by reacting an unsaturated fluorine-containing hydroxy compound with sulfur tetrafluoride. These compounds are useful for the preparation of thermally stable fluorine-containing polymers and copolymers for use as elastomers, lubricants and the like.

---

It is a principle object of the invention to provide novel fluoroolefins.

It is another object to provide a process for the preparation of these novel fluoroolefins.

Other objects will become apparent from the following detailed description thereof.

We have discovered novel fluoroolefins having the formula

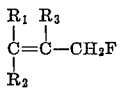

wherein $R_1$ and $R_2$ are perhalogenated alkyl groups in which the halogen atoms can be fluorine and chlorine with at least one fluorine atom attached to each carbon atom and $R_3$ can be hydrogen or alkyl groups. Preferably $R_1$ and $R_2$ each contain from 1 to 5 carbon atoms and $R_3$ when it is an alkyl group contains from 1 to 5 carbon atoms. These compositions are useful as monomers for the preparation of polymers and copolymers containing fluorine.

The fluoroolefins of the invention can be prepared by reacting an unsaturated fluorine-containing hydroxy compound having the formula

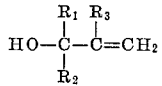

wherein $R_1$, $R_2$ and $R_3$ have the meanings given above with sulfur tetrafluoride.

The unsaturated fluorine-containing hydroxy compounds described above have been disclosed in a copending application of Dear and Gilbert, Ser. No. 550,113, filed May 16, 1966, now abandoned. They can be prepared by reacting an alkenyl magnesium halide with a perhalogenated acetone in a solvent, such as tetrahydrofuran, followed by an acid hydrolysis.

Another process for the preparation of the fluorine-containing hydroxy compounds has been described in a copending application of Lichstein and Woolf filed concurrently herewith Serial No. 641,460 whereby fluorinated dihydric alcohols having the formula

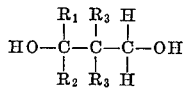

wherein $R_1$, $R_2$ and $R_3$ have the meanings given above and at least one $R_3$ is hydrogen are contacted with a dehydrating agent.

Hydroxy compounds suitable for use in the invention include, for example:

1,1,1-trifluoro-2-trifluoromethyl-3-buteneol,
1,1,1-trifluoro-2-chlorodifluoromethyl-3-butene-2-ol,
1 - chloro - 1,1 - difluoro-2-chlorodifluoromethyl-3-butene-2-ol,
1,1,1-trifluoro-2-trifluoromethyl-3-ethyl-3-butene-2-ol,
1,1,1 - trifluoro-2-fluorodichloromethyl-3-methyl-3-butene-2-ol, and the like.

Although the exact mechanism of the reaction between the unsaturated fluorine-containing hydroxy compounds described above and sulfur tetrafluoride is unknown, it is believed that the hydroxyl group is replaced initially by a fluorine atom, and rearrangement of the molecules occurs such that a stable internal olefin is obtained wherein the new fluorine atom is attached to a primary carbon atom.

The reaction can be further illustrated according to the equation given below:

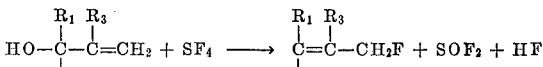

In a typical procedure, sulfur tetrafluoride is admixed with an unsaturated fluorine-containing hydroxy compound described hereinabove in a mol ratio of at least 1 to 1 in a suitable vessel and the resultant mixture stirred at ambient temperature and pressure. An excess of sulfur tetrafluoride can be employed advantageously to improve the rate of reaction and the yield of product. Preferably from about 2 to 7 mols of sulfur tetrafluoride per mol of fluorinated hydroxy compound is employed.

The product can be recovered in any convenient manner such as by distillation.

The fluoroolefins of the invention can be polymerized to linear fluorine-containing polymers in conventional manner, and they can also be admixed with known monomers including compounds having vinyl unsaturation and copolymerized to prepare fluorine-containing copolymers useful as thermally stable elastomers and lubricants.

The following examples are given to further illustrate the invention, but it is to be understood that the invention is not to be limited to the details described therein. In the examples all parts are by weight unless otherwise noted.

EXAMPLE 1

31 parts by weight of 1,1-bis(perfluoromethyl)-1,3-propanediol were added to 20 parts by volume of concentrated sulfuric acid, maintained at a temperature of 250° C., over a period of about 4 hours. The product boiling at temperatures up to 300° C. was collected, dried over magnesium sulfate, filtered and redistilled. A first fraction boiling at 76° C. was 98% pure according to vapor phase chromatographic analysis. Elemental analysis was as follows: Calculated for $C_5H_4OF_6$: C, 30.94; H, 2.08. Found: C, 30.6; H, 2.16.

The product was confirmed as 1,1,1-trifluoro-2-trifluoromethyl-3-butene-2-ol by infrared and nuclear magnetic resonance analyses.

23 parts of 1, 1, 1-trifluoro-2-trifluoromethyl-3-butene-2-ol as prepared above and 89 parts of sulfur tetrafluoride (mol ratio 1:6.95) were condensed at —78° C. and transferred under vacuum to a predried glass pressure vessel. The mixture was stirred at room temperature for about 3 days during which period a maximum pressure of 227 psig developed in the vessel. The resultant product was distilled under vacuum through a —78° C. trap and redistiled at atmospheric pressure. The product having a boiling point of 47° C. was collected. A 47.4% yield of 1, 1, 1-trifluoro-2-trifluoromethyl-4 fluoro-2-butene was obtained. It was 100% pure as determined by vapor phase chromatographic analysis. The structure was confirmed by infrared analysis. The results of elemental analysis were: Calculated for $C_5H_2F_7$: C, 30.6; H, 1.5. Found: C, 31.8; H, 1.7.

EXAMPLE 2

12 parts of 1, 1, 1-trifluoro-2-trifluoromethyl-3-butene-2-ol as prepared in Example 1 and 17.3 parts of sulfur tetrafluoride (mol ratio 1:2.59) were condensed under vacuum at −78° C. into a nickel autoclave and stirred together at room temperature for 17 hours. The maximum pressure reached was 89 psig. The product mixture was distilled under vacuum through a trap at −78° C. and redistilled at atmospheric pressure. A 58.5% yield of product boiling at 56–63° C. was obtained. Nuclear magnetic resonance analysis confirmed the structure of 1, 1, 1-trifluoro-2-trifluoromethyl-4-fluoro-2-butene. Elemental analysis found was C, 30.3; H, 1.5.

EXAMPLE 3

The procedure of Example 2 is followed using 1,1,1-trifluoro-2-chlorodifluoromethyl-3-butene-2-ol. The structure of the product, 1,1,1-trifluoro-2-chlorodifluoromethyl-4-fluoro-2-butene is confirmed by infrared and nuclear magnetic resonance analyses.

EXAMPLE 4

The procedure of Example 2 is followed using 1,1,1-trifluoro - 2 - fluorodichloromethyl - 3 - methyl - 3 - butene-2-ol. The structure of the product, 1,1,1-trifluoro-2-fluorodichloro - methyl - 3 - methyl - 4 - fluoro - 2 - butene is confirmed by infrared and nuclear magnetic resonance analyses.

It will be apparent that many modifications and variations may be effected without departing from the novel concepts of the present invention, and the illustrative details disclosed are not to be construed as imposing undue limitations on the invention.

We claim:
1. A compound having the formula:

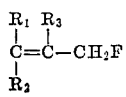

wherein $R_1$ and $R_2$ are perhalogenated alkyl groups of from 1 to 5 carbon atoms in which the halogen atoms are selected from the group consisting of fluorine and chlorine, with at least one fluorine atom attached to each carbon atom, and $R_3$ is a member selected from the group consisting of hydrogen and alkyl groups of 1 to 5 carbon atoms.

2. 1,1,1-trifluoro-2-trifluoromethyl-4-fluoro-2-butene.

3. A process for the preparation of compounds having the formula:

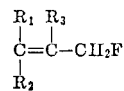

wherein $R_1$ and $R_2$ are perhalogenated alkyl groups of 1 to 5 carbon atoms in which the halogen atoms are selected from the group consisting of fluorine and chlorine, with at least one fluorine atom attached to each carbon atom, and $R_3$ is a member selected from the group consisting of hydrogen and alkyl groups of 1 to 5 carbon atoms which comprises reacting an unsaturated hydroxy compound having the formula:

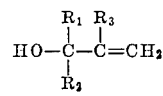

wherein $R_1$, $R_2$ and $R_3$ have the meanings given above with sulfur tetrafluoride.

4. A process according to claim 3 wherein an excess of from about 2 to about 7 mols of sulfur tetrafluoride per mol of the unsaturated hydroxy compound is employed.

References Cited

UNITED STATES PATENTS 2,700,688   1/1955   Crane et al. _____ 260—653.3

DANIEL D. HORWITZ, Primary Examiner

U.S. Cl. X.R.

252—58; 260—92.1, 900